United States Patent [19]

Kang et al.

[11] Patent Number: 5,227,435

[45] Date of Patent: Jul. 13, 1993

[54] PROCESS FOR PREPARING SILICONE MODIFIED POLYESTER RESINS AND A POWDER COATING COMPOSITION CONTAINING THEREOF

[75] Inventors: Chung-gu Kang, Suwon; Bong-jin Kim, Seoul, both of Rep. of Korea

[73] Assignee: Korea Chemical Co., Ltd., Rep. of Korea

[21] Appl. No.: 626,142

[22] Filed: Dec. 12, 1990

[30] Foreign Application Priority Data

Dec. 28, 1989 [KR] Rep. of Korea .............. 19841

[51] Int. Cl.$^5$ .............................................. C08F 20/20
[52] U.S. Cl. ........................................ 525/446; 528/25; 528/26; 528/29; 528/37
[58] Field of Search .................. 525/446; 528/25, 26, 528/29, 37

[56] References Cited

U.S. PATENT DOCUMENTS

| | | | |
|---|---|---|---|
| 4,107,148 | 8/1978 | Fujiyoshi et al. | 525/273 |
| 4,608,421 | 8/1986 | Lin | 525/403 |
| 4,764,569 | 8/1988 | Umemolo et al. | 525/446 |

OTHER PUBLICATIONS

J. Smarsh, J. Paint Technology, 44 (No. 565), Feb. 1972.
Lee and Neville, Handbook of Epoxy Resins (1967), p. 15–13.
Noll, Chem. & Tech. of Silicones (1968) p. 3.

*Primary Examiner*—John C. Bleutge
*Assistant Examiner*—D. E. Aylward
*Attorney, Agent, or Firm*—Lowe, Price, LeBlanc & Becker

[57] ABSTRACT

A process for preparing polyester resins for powder coatings by using monomers having a low glass transition temperature and silicone compounds comprises (1) condensation reacting silicone compounds with alcohols having at least two hydroxyl groups, (2) reacting resins prepared by the step (1) with acidic compounds in the presence of esterification catalysts, and (3) reacting resins prepared by step (2) with trimellitic anhydride in the presence of catalysts to form polyester resins having an acid value of 30 to 100, a low melting viscosity, a low softening point, excellent storage stability, good heat-resistance and a good appearance.

7 Claims, No Drawings

PROCESS FOR PREPARING SILICONE MODIFIED POLYESTER RESINS AND A POWDER COATING COMPOSITION CONTAINING THEREOF

FIELD OF THE INVENTION

The present invention relates to a process for preparing silicon modified polyester resins used for powder coatings by using silicon compounds and to a powder coating composition containing these resins. Particularly, the silicon modified polyester resins of the present invention are prepared by using silicone compounds which can enhance heat-resistance and storage stability while keeping the appearance of film coatings since the silicone compounds can enlarge molecular interactive energy and provide the flexibility of chains for monomers having a low glass transition temperature.

DESCRIPTION OF THE PRIOR ART

Acidic polyester resins which are used in the hybrid type powder coatings of conventional polyester-epoxy resins have carboxyl groups at the terminal ends of the high molecular polymer, which groups react with an epoxy group in the epoxy resin to form film coatings having a solid and graceful appearance as described below.

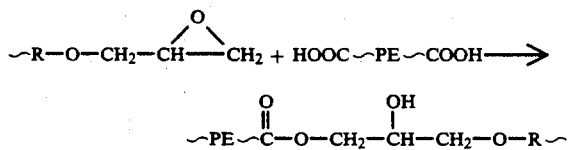

The procedure of forming a film coating comprises coating the powder coatings (polyester-epoxy resins mixture) to a coatable material by using a static spray gun, melting the powder by heating the material at 150° C. to 200° C. to make the liquid phase smooth, and finally curing them. In other words, a softening point and a melting viscosity of polyester resins should be low in order to obtain a uniform film coating. However, a glass transition temperature of the monomer to be used must be low to prepare the resins having a low softening point and a low melting viscosity, which results in poor heat-resistance in the film coatings.

In the conventional powder coatings, since a monomer having a low glass transition temperature was used in order to form a good film coating, the monomer could not only result in degrading heat-resistance but also cause poor storage stability, such as forming a bulk in summer. Also, when the conventional powder coatings including the monomer were used in electric heaters, the resulting coatings could be degraded to change color or could be softened to form a bulk. Therefore, endurance of the powder coatings could be degraded. However, when the monomer having a high glass transition temperature or the resins of high molecular weight are used for the purpose of overcoming the above disadvantages, the heat-resistance and storage stability can be improved but the melting flow of the resins is deteriorated and the appearance of film coatings thereby can be worse.

SUMMARY OF THE INVENTION

Accordingly, it is an object of the present invention to provide a process for preparing silicon modified polyester resins comprising (1) a condensation of silicone compounds with alcohols, (2) a reaction of the resins prepared by the step(1) with acidic compounds in the presence of esterification catalysts, and (3) a reaction of the resins prepared by step(2) with trimellitic anhydride in the presence of catalysts to enhance an acid value.

It is an another object of the present invention to provide a powder coating composition containing the above polyester resins.

These and other objects of the invention will become more apparent in the detailed description and examples which follow.

DETAILED DESCRIPTION OF THE INVENTION

This invention relates to a process for preparing polyester resins for powder coatings by using monomers having a low glass transition temperature and silicone compounds in order to overcome the disadvantages found in the prior art. Therefore, the present invention provides the polyester resins which have a low melting viscosity, a low softening point, excellent storage stability, and good heat-resistance without any changes of appearance found in the physical properties of the conventional coatings.

The detailed process according to the present invention comprises: (1) the first step of a condensation reaction of the silicone compounds with alcohols, (2) the second step of the reaction of the resin of step (1) with acidic compounds in the presence of a catalyst, and (3) the third step of the reaction of the resins of step (2) with trimellitic anhydride in the presence of a catalyst to form the silicon modified polyester resins for powder coatings.

The resulting silicon modified polyester resins for powder coatings have a graceful appearance in the film coatings, and exhibit the excellent heat-resistance and storage stability.

The aforementioned process comprising three steps of reactions for preparing the silicon modified polyester resins is described in details below:

1. The condensation reaction of silicone compounds with alcohols

5~15 by weight parts of silicone compounds, 75~90 by weight parts of neopentyl alcohol and 10~25 by weight parts of diethylene alcohol as alcohol compounds having more than two reactive groups are charged in a reactor equipped with a stirrer, a thermometer, a nitrogen (inert gas) inlet tube and a cooler. The temperature of the reactor is increased then with injecting nitrogen as an inert gas.

When the silicone compounds are used in an amount of more than 15 by weight parts, gelation results, and when used in an amount of less than 5 by weight parts, they can not enhance the heat-resistance which is the principal object of the present invention.

When the neopentyl glycol is used in an amount of less than 75 by weight parts, the heat-resistance, impact strength and chemical resistance may be decreased while the melting viscosity is to be decreased since the cross-linkage density is lower.

When the glycol is used in an amount of more than 90 by weight parts, the heat-resistance, resistance against chemical agents and impact strength are enhanced due to the increase of the cross-linkage density but the appearance of film coating is worse by influencing harmfully on the formation of uniform film coating due to the increase of melting viscosity.

Diethylene glycol has an ether bond in the molecular structure, so it can normally enhance the hardness and flexibility of the film coatings. However, when diethylene glycol is used in an amount of less than 10 by weight parts, the flexibility and hardness are decreased and the worse appearance of the film coating is exhibited due to the high melting viscosity.

When diethylene glycol is used in an amount of more than 25 by weight parts, the hardness is improved but the storage stability is degraded due to the high flexibility of the molecules.

In the above reaction, the reactants are effused at about 145° C. to 150° C. and the condensate water is removed at about 150° C. to 170° C. and then cooled down to 110° C. to 130° C. When the reaction is proceeded at higher than 200° C., the silicone monomers are effused and they may cause the side reactions.

The alcohols to be used in this step comprise aliphatic or alicyclic alcohols having 2 to 3 hydroxyl groups and 2 to 6 carbons including the secondary alcohols such as ethylene glycol, diethylene glycol, propylene glycol, 1,4-butanediol, 1,3-butanediol, 1,5-butanediol, 1,6-hexanediol, neopentyl glycol, 1,4-cyclohexandiol and triethylene glycol and the tertiary alcohols such as trimethylol propane and glycerin.

In particular, the present invention could get a good result by using the mixture of neopentyl alcohol and diethylene glycol.

Moreover, the present invention should use reactive silicone compounds in the aforementioned step to enhance the heat-resistance. The kinds, molecular structure and effects of the compounds are described as follows;

The kinds of silicones are classified to four according to functional groups and they are as follow; M unit as a unit of one functionality; D unit as a unit of two functionalities; T unit as a unit of three functionalities; and Q unit as a unit of four functionalities.

The structure of each unit is shown as follows;

M unit: $(R)_3SiO_{\frac{1}{2}}$

D unit: $(R)_2SiO_{2/2}$

T unit: $RSiO_{3/2}$

Q unit: $SiO_{4/2}$ wherein the organic group R includes —$CH_3$, —$C_2H_5$, —$C_6H_5$, —$CH=CH_2$ and/or —$C_3H_7$, preferably —$CH_3$ and —$C_6H_5$.

The combination of D unit and T unit are usually used for preparing powder coatings mainly to enhance the heat-resistance. Therefore, the present invention also uses the silicon compounds comprising —$CH_3$ and —$C_6H_5$ in amounts of 30 wt % to 40 wt %, respectively. As a reference, Z-6018$^R$ made by DOW CORNING CO., Ltd. has the following molecule structure.

$(CH_3)_2SiO_{2/2}$ $CH_3 C_6H_5SiO_{2/2}$ $(C_6H_5)_2SiO_{2/2}$

T unit: $CH_2SiO_{3/2}$ $C_6H_5SiO_{3/2}$

When the molecule contains the aforementioned silicone compounds having a functional group such as ≡Si—OH or ≡Si—OR, the ≡Si—OH is reacted with ~R—OH in alcohols to form ≡Si—O—R~.

With a view of the structure, it has a strong bond energy of ≡Si—O— between molecules and a good flexibility of —O— simultaneously. Therefore, the polyester resins used for powder coatings have excellent heat-resistance along with low melting viscosity, low softening point and enhanced storage stability.

The reaction mechanism of silicones with alcohols is shown in the following formula (1);

$$\equiv Si-OH + HO-R-OH \rightarrow \equiv Si-O-R-OH- + H_2O \quad (1)$$

To be more comprehensible, relative bond energys are described in TABLE 1.

TABLE 1

| Bond | ≡Si—O | C—H | C—O | C—C | Si—C |
|---|---|---|---|---|---|
| Bond energy (Kcal) | 106 | 89 | 86 | 83 | 76 |

2. Addition of Acid in the Resins Prepared in Step 1

65 to 70 by weight parts of terephthalic acid, 5 to 15 by weight parts of adipic acid and 0.05 to 0.5 by weight parts of esterification catalyst are added to 100 by weight parts of the resins prepared in step 1 by reaction of some parts of alcohols with silicone compounds and then the temperature is increased.

When the terephthalic acid of more than 70 by weight parts is used, the crystallinity is so high that the mechanical properties may be degraded and when the terephthalic acid is used in an amount of less than 65 by weight parts, a glass transition temperature and softening point are low and storage stability thereby is worse.

Adipic acid is used in state of a linear adipic acid within the range of controlling the melting viscosity that can be directly concerned with a flatness which is a major characteristic of powder coatings without any effects on other physical properties such as chemical resistance and appearance of film coatings. When the linear adipic acid is used in an amount of less than 5 by weight parts, the appearance of film coatings is worse due to the increasing of melting viscosity and decreasing of the flexibility. And, when the acid of more than 15 by weight parts is used, the appearance of film coatings is better because of increasing the flexibility but the storage stability is worse due to the decreasing of a softening point. After then, the condensated water is effused at 160° to 175° C. and the temperature is increased to 240° to 250° C. to remove sufficiently the condensated water. The resulting products are to be transparent. At this time, the quantity of the injection of nitrogen is increased to prepare a prepolymer having an acid value of 5 to 8, a hydroxyl value of 30 to 80, an average molecular weight of 2000 to 3000, and a melting viscosity of 30 to 15 poise at 150° C., and then the temperature is cooled down to 160° C.

The acid compounds in the above step are aliphatic or aromatic carboxyl acids having 4 to 12 carbons and more than two functional groups such as adipic acid, succinic acid, sebacic acid, terephthalic acid, isophthalic acid, 1,4-cyclohexane dicarboxyl acid, azelaic acid, trimellitic acid, trimellitic anhydride and the like thereof. Particularly, the terephthalic acid and adipic acid are preferable.

3. The Reaction of the Prepolymer Prepared in Step 2 With Trimellitic Anhydride 10 to 25 by weight parts of trimellitic anhydride and 0.01 to 0.1 by weight parts of esterification catalyst are reacted with 100 by weight parts of the prepolymer prepared in the above reaction (step 2) at 160° to 170° C. for 2 hours and then the temperature is increased to 190° to 200° C. In order to remove the condensated water and enhance a degree of the polymerization at the predetermined acid value and melting viscosity, the quantity of nitrogen to be injected is increased or a pressure in the reactor is reduced to 100 to 200 mmHg to remove the condensated water and unreacted (monomers) in the reaction system.

Trimellitic anhydride is used to give branched sites in the saturated polyesters. It can also contribute to the good appearance of the film coatings and enhance the resistance against chemical agents. When trimellitic anhydride is used in an amount of more than 25 by weight parts, a mechanical property, flexibility and melting viscosity are degraded because the cross-linkages are increased to enhance the glass transition temperature and the softening point. When the trimellitic anhydride is used in an amount of less than 10 by weight parts the storage stability, the appearance of powder coatings and the resistance against the chemical agents are degraded due to the lowering of the glass transition temperature and the softening point.

The polyester resins of this invention are prepared by the reaction of the acid mixture including at least one kind of aliphatic acid having more than two functional groups, preferably the acid mixture of 10 to 25 by weight parts of trimellitic acid, 5 to 15 by weight parts of adipic acid and 65 to 70 by weight parts of terephthalic acid, with 5 to 15 by weight parts of silicone compounds and with the mixture of aliphatic alcohols having at least two reactive groups, preferably the alcohol mixture comprising 10 to 25 by weight parts of diethylene glycol and 75 to 80 by weight parts of neopenthyl glycol.

As described above, the process of the present invention comprises three steps of reactions unlike a conventional process which comprises only two steps of reactions as follows: firstly, the acid and the alcohol are reacted with oxides simultaneously and secondly, additional acids are charged to be reacted.

In the conventional process, beads were formed by means of the flocculation of silicones in the second step while the melting viscosity and the softening point of the resulting resins were relatively lowered. As a result, after the coatings were melted, many pinholes and cratering phenomena were created on the surface of the coatings due to the unreacted silicones and the beads. Good effects of the heat-resistance and storage stability were not disclosed. Moreover, when the ratio of the silicone compounds to the acid compounds was increased, the melting viscosity and the softening point were relatively lowered, and the occurrence of boiling and the phenomena of cratering and pinholes were more serious.

The resulting silicon modified polyester resins of the present invention have an acid value of 30 to 100 and are used by the following method to prepare powder coatings.

The powder coatings are prepared by using the resins prepared by the above three steps of reactions and components described in TABLE 2.

TABLE 2

| COMPONENT | WEIGHT PARTS |
|---|---|
| Polyester resin prepared by the present invention | 40~60 |
| Epoxy Resin | 20~40 |
| Titanium Dioxide | 20~30 |
| Curing accelerator | 0.2~4 |
| Other additives (flow agent, ultraviolet absorbent and antioxidant) | 0.2~4 |

The above components in TABLE 2 are charged in a mixer and mixed homogeneously and then melted by using an extruder at 90° to 120° C. Thereafter the product is cooled and crushed to form powders in the range of less than 100 microns.

The powder coatings prepared by the above procedure have a superior storage stability and the cured film thereof have a superior heat-resistance without any damages in the appearance.

The following EXAMPLES are experimental according to the amounts of silicone compounds and describe in details the resins of the present invention, a process for preparing powder coatings, and their effects. However, the following EXAMPLES are included merely to aid in the understanding of the invention, and variations may be made by one skilled in the art without departing from the spirit and scope of the invention.

EXAMPLE 1

1) A Preparation of Silicon Modified Polyester Resins

TABLE 3

| COMPONENTS | WEIGHT PARTS |
|---|---|
| Neopentyl glycol | 650 |
| Diethylene glycol | 190 |
| Silicone compounds (Z-6018)* | 80 |
| Terephthalic acid | 980 |
| Adipic Acid | 73 |
| Fascat 4101** | 2 |
| Irganox 1076*** | 1 |
| Trimellitic anhydride | 180 |
| Fascat 4101 | 1 |

NOTE:
*The product of DOW CORNING Co., Ltd. of U.S.A.
**The product of M & T Co., Ltd. of U.S.A.
***The product of CIBA-GEIGY A. G. of Swiss.

The resins were prepared by the aforementioned three steps of processes and by using the components in TABLE 3. In the first step of reaction, neopentyl glycol, diethylene glycol and silicone compounds were charged in a reactor equipped while stirrer, thermometer, nitrogen inlet tube and cooler and reacted at 140° to 170° C. while removing the condensated water and then cooled down to 110° to 130° C.

In the second step of reaction, the resins prepared by the first reaction were reacted with terephthalic acid, adipic acid and Fascat 4101 ® of 2 by weight parts as an esterification catalyst. The reaction proceeded with a gradual temperature increase. Since the condensated water of the reaction was effused initially at 170° to 180° C., the reaction temperature was increased up to 240° to 260° C. to remove the condensated water. Therefore the transparent reactants were formed.

The inert gas (Nitrogen) was injected in the resulting reactants while increasing its quantity to form a prepolymer having an acid value as low as 5 and a hydroxyl value of 50.

In the third stage of reaction, trimellitic anhydride and Fascat 4101 ® of 1 by weight parts were added to the prepolymer prepared by the second step of reaction and then continued to be reacted at 160° to 170° C. for 2 hours. After then, the reaction temperature was increased at 190° to 200° C. to remove the condensated water and the unreacted.

In order to enhance the degree of the polymerization, an excess of nitrogen having a flow rate of 5 to 40 l/minute was injected at a little higher point (Acid value 1 of 54~55) than the optimum acid value (50) and thereby polyester resins having the acid value of 50 and the viscosity of 23 poise at 170° C. were obtained to 1900 by weight parts.

(2) A Preparation for Powder Coatings

TABLE 4

| COMPONENT | Quantity (weight parts) |
| --- | --- |
| Silicon modified polyester resins prepared by the above example 1-(1) | 600 |
| D.E.R. 6630*[1] | 300 |
| D.E.R. 664*[1] | 100 |
| Titanium Dioxide | 500 |
| Benzoin | 5 |
| CUREZOL C112*[2] | 2.0 |
| MODAFLOW I*[3] | 6.0 |
| TINUVIN*[4] | 2.0 |

NOTE
*[1]Epoxy resins made by DOW CHEMICAL Co. of U.S.A.
*[2]Imidasol as a curing accelerator made by SHICOKU KASEI Co. of Japan.
*[3]Flow agent made by Monsanto Co. of U.S.A.
*[4]Ultraviolet absorbent made by Ciba Geigy Co. of Swiss The components described in TABLE 4 were charged in a mixer and blended homogeneously. And then the mixture was charged in an extruder, melted and blended at 90° to 120° C. and cooled.

After then, the compounds were crushed with less than 100 microns and coated by static spray gun. After coating, they were cured at 180° to 200° C. for 10 to 20 minutes to obtain the film coatings having the thickness of about 60 microns.

EXAMPLE 2

EXAMPLE 2 proceeded in the same manner as EXAMPLE 1 above except the quantity of silicone compounds is 160 by weight parts.

Finally, the silicon modified polyester resins having the acid value of 51 and the viscosity of 23.5 poise at 175° C. were prepared to 1970 by weight parts.

Furthermore, the powder coatings were prepared in the same method as EXAMPLE 1 above except for using the resins prepared by EXAMPLE 2.

EXAMPLE 3

EXAMPLE 3 proceeded in the same manner as EXAMPLE 1 above except the quantity of silicone compounds is 180 by weight parts.

Finally, the silicon modified polyester resins having the acid value of 51 and the viscosity of 24 poise at 175° C. were prepared to 1990 by weight parts.

Furthermore, the powder coatings were prepared by the same method as EXAMPLE 1 above except for using the resins prepared by EXAMPLE 3.

COMPARATIVE EXAMPLE 1

1) A Preparation for Silicon Modified Polyester Resin

Using the same components and the quantity as EXAMPLE 1, the resins of the COMPARATIVE EXAMPLE 1 were prepared by a conventional two step process.

In the first step of the reaction, neopentyl glycol, diethylene glycol, silicone compounds, terephthalic acid, adipic acid, 2 by weight parts of Fascat 4101 and Iraganox 1076 were charged in the same reactor as EXAMPLE 1 and the temperature was increased to 170° to 180° C. to remove the condensated water.

The temperature was increased at 240° to 260° C. to react them and thereby the reactant was transparent. At the same time the quantity of nitrogen was increased to prepare the prepolymer having an acid value of less than 5, and a hydroxyl value of 50 and then cooled down at 160° to 170° C.

In the second step of the reaction, trimellitic anhydride and 1 by weight parts of Fascat 4101 were reacted with the prepolymer prepared in the first step at 160° to 170° C. for 2 hours and then continued to react them at 190° to 200° C.

When an acid value was a little higher (54 to 56) than the optimum acid value (50), the quantity of nitrogen was increased to enhance the polymerization by means of removing the condensated water and unreacted (monomers).

As the results, polyester resins having an acid value of 50 and a viscosity of 19 poise at 175° C. were prepared to 1900 by weight parts. However, in the resulting resins beads were formed by flocculation of silicons and a melting viscosity and a softerning point were very low as shown in TABLE 5.

2) A Preparation for Powder Coatings

According to the same method as EXAMPLE 1 above except for using the polyester resins prepared in the COMPARATIVE EXAMPLE 1, powder coatings were prepared and coated. The physical properties of the resulting film coatings are shown in TABLE 5.

As shown in TABLE 5, a pinhole and cratering phenomena were arisen due to the silicone beads and unreacted on the film coatings and the heat-resistance and storage stability thereof were poor.

COMPARATIVE EXAMPLE 2

The resins were prepared by the method of COMPARATIVE EXAMPLE 1 and by using the same components and quantity as EXAMPLE 2.

The polyester resins having an acid value of 50 and a viscosity of 17 poise at 175° C. were prepared with 1970 by weight parts.

Even though the quantity of silicone compound was more than that of COMPARATIVE EXAMPLE 1, the occurrence of beads was very serious rather than COMPARATIVE EXAMPLE 1 and a softening point and a melting viscosity were relatively low.

The preparation of powder coatings proceeded the same as the method of EXAMPLE 1 except for using the resins prepared by COMPARATIVE EXAMPLE 2.

COMPARATIVE EXAMPLE 3

The resins were prepared by the method of COMPARATIVE EXAMPLE 1 and by using the same components and quantity as EXAMPLE 3.

The polyester resins having an acid value of 50 and a viscosity of 17 poise of 175° C. were prepared with 1990 by weight parts.

As the quantity of silicone compounds was increased compared with COMPARATIVE EXAMPLE 1 and COMPARATIVE EXAMPLE 2, the occurrence of beads was more serious and a melting viscosity and a softening point were relatively low.

The preparation of powder coatings proceeded the same method as EXAMPLE 1 except for using the resins prepared by COMPARATIVE EXAMPLE 3.

TABLE 5 presents the physical properties of the resins and the powder coatings prepared by the above EXAMPLES and COMPARATIVE EXAMPLES.

TABLE 5

| TEST ITEM | EXAMPLE 1 | COMPARATIVE EXAMPLE 1 | EXAMPLE 2 | COMPARATIVE EXAMPLE 2 | EXAMPLE 3 | COMPARATIVE EXAMPLE 3 |
|---|---|---|---|---|---|---|
| The properties of the resins | | | | | | |
| Acid value | 50 | 50 | 51 | 50 | 51 | 50 |
| Viscosity (at 175° C., poise) | 23 | 19 | 23.5 | 17 | 24 | 17 |
| Softening point [°C., ASTM D246-36] | 106.3 | 109.6 | 114.7 | 107.9 | 116 | 105.7 |
| Melt Flow Index at 125° C. [JISK-726] | 14.42 | 13.8 | 15.1 | 14.1 | 11.2 | 15.1 |
| The properties of the film coating | | | | | | |
| Heat-resistance (200° C. × 1 hr) E value | 1.34 | 1.95 | 0.85 | 1.3 | 0.56 | 1.3 |
| Heat-Resistance (210° C. × 1 hr) E value | 1.92 | 2.99 | 1.78 | 1.84 | 1.45 | 1.85 |
| Storage stability (35° C. × 72 hrs) | good | acceptable | excellent | bad | excellent | bad |
| Impact strength [1 kg-cm] | >50 | >50 | >50 | >50 | >50 | >50 |
| Appearance | good | good | good | bad | good | bad |
| Pinhole and cratering | No occurrence | occurrence | No occurrence | occurrence | No occurrence | occurrence |
| Gloss | 97 | 94 | 98 | 97 | 98 | 96 |
| Flexibility (¼″) | good | good | good | good | good | good |
| Adhesion | good | good | good | good | good | good |
| Resistance against boiling water (100° C. × 1 HR) | excellent | good | excellent | excellent | excellent | excellent |
| Alkaline Resistance (5%, NaOH) | good | good | excellent | good | excellent | excellent |
| Corrossive Resistance | good | good | good | good | good | good |
| Acidic Resistance (5% CH₃COOH) | good | good | good | good | good | good |
| Resistance against solvent (xylene × 24 hrs) | good | good | good | good | good | good |

Note: ΔE indicates that the less value means the better heat-resistance.

We claim:

1. A process for preparing silicon modified polyester resins, which comprises the steps of:
   (a) condensation reacting siloxane compounds with alcohol compounds having at least two hydroxyl groups, the siloxane compounds being used in an amount of 5 to 15 parts by weight based on 100 parts by weight of the alcohol compounds;
   (b) reacting 100 parts by weight of resins prepared by step (a) with 70 to 85 parts by weight acidic compounds in the presence of esterification catalysts; and
   (c) reacting 100 parts by weight of resins prepared by step (b) with 10 to 25 parts by weight trimellitic anhydride in the presence of catalysts to enhance the acid value of the resulting product.

2. The process in accordance with claim 1, wherein the siloxane compounds comprise at least one selected from the group consisting of the following molecular structures (I), (II), (III) and (IV), $(R)_3SiO_{\frac{1}{2}}$: M unit        (I)

$(R)_2SiO_{2/2}$: D unit        (II)

$RSiO_{3/2}$: T unit        (III)

$SiO_{4/2}$: Q unit        (IV)

wherein R is selected from the group consisting of —CH$_3$, —C$_2$H$_5$, —C$_6$H$_5$, —CH=CH$_2$ and —C$_3$H$_7$, to form a condensate including the structure $(R)_{4-n}Si(O-R_1-OH)_n$ wherein the $R_1$—OH are moieties derived from the alcohol compounds.

3. The process in accordance with claim 2, wherein —CH$_3$ and —C$_6$H$_5$ groups are included as the R group in amounts of 30 wt % to 40 wt %, respectively, based on the total R groups.

4. The process in accordance with claim 2, wherein functional groups of said siloxane compounds are selected from the group consisting of —OH, —OR and —COOH.

5. The process in accordance with claim 1, wherein the alcohol compounds having at least two hydroxyl groups comprise neopentyl glycol in an amount of 75 to 90 parts by weight and diethylene glycol in an amount of 10 to 25 parts by weight.

6. The process in accordance with claim 1, wherein the acidic compounds are composed of terephthalic acid in an amount of 65 to 70 parts by weight and adipic acid in an amount of 5 to 15 parts by weight, based on 100 parts by weight of the resins prepared by said step (a).

7. A powder coatings composition which comprises 40 to 60 parts by weight of silicon modified polyester resins prepared according to claim 1, 20 to 40 parts by weight of epoxy resins, 10 to 30 parts by weight of titanium dioxide and 0.2 to 4 parts by weight of additives and a curing accelerator.

* * * * *